United States Patent
Kawamura et al.

(10) Patent No.: US 6,230,479 B1
(45) Date of Patent: May 15, 2001

(54) METHOD OF CONTROLLING LOAD ON POWER PLANT AND LOAD CONTROL SYSTEM FOR CARRYING OUT THE SAME

(75) Inventors: Hideyuki Kawamura, Hitachi; Toshihiko Harashima, Hitachiota; Shoei Takahashi; Takeshi Ishida, both of Hitachi, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/310,937

(22) Filed: May 13, 1999

(30) Foreign Application Priority Data

May 14, 1998 (JP) .................................................. 10-131599

(51) Int. Cl.$^7$ ...................................................... F02C 9/00
(52) U.S. Cl. ............................................................. 60/39.03
(58) Field of Search ............................... 60/39.03, 39.281

(56) References Cited

U.S. PATENT DOCUMENTS 5,761,895 * 6/1998 Chu et al. ............................ 60/39.03

* cited by examiner

Primary Examiner—Charles G. Freay
Assistant Examiner—William H Rodriguez
(74) Attorney, Agent, or Firm—Kenyon & Kenyon

(57) ABSTRACT

The invention suppresses the production of thermal stress in power generating equipment and the unstable behavior of the power generating equipment due to the variation of system frequency and stabilizes the system frequency. A power plant load control system controls the operation of a power plant equipped with a gas turbine comprising a combustor (1) and a turbine (3), and a power generator (5) disposed coaxially with the turbine. The power plant load control system comprises a governor load control unit (100) for determining a governor instruction (103d) on the basis of the deviation of generated power (102d) from a power generation instruction (101d) given thereto by a central load dispatching station according to the variation of system frequency, and for determining a fuel supply rate instruction (107d) corresponding to a speed droop ratio (R) according to the deviation of shaft speed (104d) from a governor instruction (103d). The governor load control unit (100) has a fuel supply rate instruction limiter (107) for limiting the change rate of the fuel supply rate instruction (107d). The fuel supply rate instruction limiter (107) determines a limit to the change rate so that the production of thermal stress in the gas turbine and unstable combustion may be suppressed, and limits the variation of the fuel supply rate instruction (107d) to a range below the limit.

8 Claims, 9 Drawing Sheets

METHOD OF CONTROLLING LOAD ON POWER PLANT AND LOAD CONTROL SYSTEM FOR CARRYING OUT THE SAME

BACKGROUND OF THE INVENTION

The present invention relates to a method of controlling load on a thermal power plant and, more particularly, to a method of controlling load on a power plant in which the flow rate of fuel supplied to a gas turbine is regulated to control load on the power plant.

A thermal power plant controls the flow rate of fuel supplied to a gas turbine installed therein or the flow rate of steam supplied to a steam turbine installed therein according to a load dispatching instruction given to the thermal power plant by a central load dispatching station. The system frequency (50 Hz in the Eastern Japan and 60 Hz in the Western Japan) is stabilized by adjusting power generation through the adjustment of shaft speed by a speed signal according to contribution ratio also called speed droop ratio. For example, the flow rate of fuel supplied to the combustor of a gas turbine is controlled on the basis of system contribution ratio according to information about system frequency varying according to the variation of total load on the system. This mode of control is called governor load control or governor-free control.

For example, when the 100% speed of a power generator of 5% in speed droop ratio is 50 Hz, governor load control adds fuel for 100% rated power generation capacity per 2.5 Hz equal to 5% speed to an initial fuel supply rate. Actual system frequency is relatively stable during operation at a rated output power and hence frequency change is 1% or below.

As shown in FIG. 10, the relation between system frequency and fuel supply rate in governor load control adds 20% of fuel supply rate per 1% to an initial specified flow rate or subtracts the same from the initial specified flow rate because 100% load adjustment per 5% is necessary if frequency change is 1%. The function of governor load control stabilizes system frequency and reduces fuel supply rate when the rotating speed of a turbine increases sharply due to power system fault to prevent the operation of a turbine or a power generator at an excessively high operating speed. Since a plant of 5% in speed droop ratio operates fuel supply rate for 100% load for 5% according to rotating speed, a load output instruction becomes 0% instantaneously when overspeed rises to 105%, and the output becomes negative, i.e., rotation is braked, when shaft speed exceeds 105%.

In a gas turbine power plant, fuel and compressed air is supplied to a combustor, and a gas turbine is driven by a combustion gas produced by the combustor. When governor load control is performed, fuel supply rate is adjusted at a high gain as mentioned above for the slight change of system frequency. When the fuel supply rate instruction changes sharply due to high gain or frequently, the fuel-air ratio of the mixture supplied to the combustor changes suddenly causing unstable combustion, misfire or backfire. If fuel supply rate increases to cause temperature to rise beyond an upper limit or to induce thermal stress, thermal stress in the gas turbine increases and thermal stress is accumulated in the gas turbine. The thermal stress is a principal cause of the deterioration of mechanical parts, such as the combustor and turbine blades and shortens the life of the equipment.

A gas turbine control system proposed in Japanese Patent Laid-open No. Hei 8-218897 to solve such problems performs, sets an upper limit to the temperature of the exhaust gas of a gas turbine, adds an offset to a fuel supply rate instruction for governor load control, gives temperature load control priority when the temperature difference between the upper limit and the temperature of the exhaust gas approaches naught to maintain the load on the gas turbine constant. Thus, the gas turbine control system prevents induction of an excessively high thermal stress in the gas turbine.

In conventional thermal power plants, control outputs of stop control, acceleration limiting control and load limiter, in addition to those of governor load control and temperature load control, are used in combination, and a control signal which takes a low value according to the pattern of operation and the condition of the plant is selected to control the load on the gas turbine.

However, combustion gas temperature rises near to the upper limit when the gas turbine operates under a load nearly equal to its rated load, temperature load control is selected and governor load control does not function if the control system of the cited reference is employed. Therefore, a speed droop ratio set on the basis of the power generation plan of the power system cannot be maintained. When the gas turbine operates in a partial-load operating mode in which temperature load control is not selected, governor-free control is executed. However, problems arising from unstable combustion due to the change of control instruction cannot be solved and many problems reside particularly in equipment requiring difficult fuel-air ratio control, such as a low-NOx combustor. Thermal stress is induced concentratedly on turbine blades. The same problems reside in steam turbines in which steam flow rate varies.

Thus, in the conventional thermal power plants, frequency change due to the change of load on the power system cannot be suppressed if temperature load control is performed, regarding the life shortening effect of thermal stress and unstable combustion as important. When governor load control is performed to maintain speed droop ratio when the power system is unstable, thermal stress and unstable combustion is enhanced because load instruction varies in a wide range when the power system is unstable. Thus, there are conflicting problems.

It is an object of the present invention to solve those problems in the prior art and to provide a method of controlling load on a thermal power plant, capable of maintaining system contribution by governor load control, of extending the life of equipment and of stabilizing combustion.

Another object of the present invention is to provide a load control system for controlling load on a thermal power plant, capable of maintaining system contribution by governor load control, of extending the life of equipment and of stabilizing combustion.

SUMMARY OF THE INVENTION

With the foregoing object in view, the present invention provides a power plant load control method comprising producing a governor load control signal on the basis of a load dispatching instruction (MW instruction) given according to the change of system frequency to a power plant provided with a turbine and a power generator having a shaft coupled with that of the turbine, generated power, measured shaft speed and a predetermined speed droop ratio (system contribution ratio), and controlling load on the turbine so that system frequency may be stabilized, wherein the load on the turbine is controlled by an operation instruction obtained by multiplying the governor load control signal by a load limiting function to restrict the change of the governor load control signal.

If the turbine is a gas turbine combined with a combustor, the operation instruction represents a fuel supply rate, and the load limiting function is formulated so as to suppress at least either thermal stress production in the gas turbine or unstable combustion. If the turbine is a steam turbine, the operation instruction represents a steam supply rate, and the load limiting function is formulated to suppress thermal stress production in the steam turbine.

The load limiting function is formulated according to effective contribution ratio taking into consideration mechanical inertia as against system contribution ratio. An optimum limit is determined through simulation taking into consideration the balance between effective contribution ratio, and limit thermal stress or combustion stability.

The load limiting function may use a coefficient to limit the rate of change of the governor load control signal, may be a function capable of variably limiting the rate of change according to the governor load control signal or may use a time constant, such as a time lag of first order.

According to the present invention, load on the turbine is controlled by using the operation instruction obtained by multiplying the governor load control signal by the load limiting function when the turbine is operating in a normal operating mode where the turbine operates at a speed in a predetermined range with respect to a rated speed under a rated load or a partial load. The governor load control signal not limited by the load limiting function, namely, a governor-free control signal, is selected to control the load on the turbine when the turbine operates in an overspeed mode where shaft speed is higher than the upper limit of a predetermined range.

Thus, the sudden change of the fuel supply rate instruction is suppressed to avoid incomplete combustion and thermal stress production when the turbine is operating in a normal operating mode in rated conditions or nearly equal to rated conditions and the system frequency is nearly equal to a rated frequency, and the overspeed operation of the turbine can be prevented by reducing the fuel supply rate at a high rate when the shaft speed (system frequency) increases to an excessively high level of, for example, 110% of the rated shaft speed.

The principle of operation of the present invention will be described. A governor-free control signal used in a thermal power plant follows the change of system frequency at a high gain to control load on a turbine so that system frequency may be stabilized. The change of system frequency corresponds to the change of total load on a power system. Most part of a change in fuel supply rate instruction corresponds to a system frequency change when the power generating system includes a gas turbine. Measurement showed that there is a limit to the change of system frequency which can be followed by a mechanical apparatus, such as a turbine and, if system frequency changes at a rate exceeding a limit rate, the power generating system is loaded without extending the operation of governor load, causing thermal stress production and unstable combustion.

The present invention has been made in view of such a problem. According to the present invention, the change of the governor load control signal is limited to a range including changes which can be followed by power generating equipment to suppress the production of thermal stress in the turbine and to prevent unstable combustion, and governor-free control is always effective during operation under rated load or partial load. Effective contribution ratio is one of indices of governor-free limitation.

FIG. 2 shows the variation of system contribution ratio and degree of combustion stability with change rate limiting factor. When the change rate limiting factor varies from 0% (rate of change is 0) to 100% (limitless), the theoretical system contribution ratio varies from 0% to 100% as indicated by a continuous line. Generally, since the degree of stability of combustion is high when the range of load variation is narrow, the degree of stability of combustion is the highest when the change rate limiting factor is 0% (constant-load control) and decreases as the change rate limiting factor increases toward 100%. Similarly, the level of thermal stress is low when the change of load is small.

Suppose that a system frequency change of ±1% occurs at a rate of variation of 0.5%/s, the rate of change of the actual system contribution ratio is reduced as indicated by a broken line in FIG. 2 owing to the mechanical inertia of the power generating equipment. As shown in FIG. 2, an effective contribution ratio at a change rate limiting factor of 70% and an effective contribution ratio at a change rate limiting factor of 100% are substantially the same. Thus, a frequency stabilizing function when any restriction is not placed on change rate and a frequency stabilizing function when a 70% restriction is placed on change rate are substantially the same.

Accordingly, the governor load control signal is provided through a limiter limiting a maximum change rate to 70% to maintain the system contribution ratio. When a maximum change rate is limited to 70%, incomplete combustion and the production of thermal stress can be suppressed accordingly. Consequently, the thermal characteristic of operation is improved to enable governor load control under a rated load or a load nearly equal to the rated load.

Thus, the present invention enables governor-free control by adding a simple addition to governor-free control, enables governor-free control to exercise its function at all times, maintains or substantially improves the system contribution ratio of the power generating equipment, extends the life of the equipment and stabilizes combustion.

An overspeed relaxing function of the governor load control function deteriorates when the limiting function is added to governor load control. However, a fail-safe operation can be achieved by making the limiting function ineffective in an overspeed state or by using a conventional governor load control function not having any limiting function.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 3:
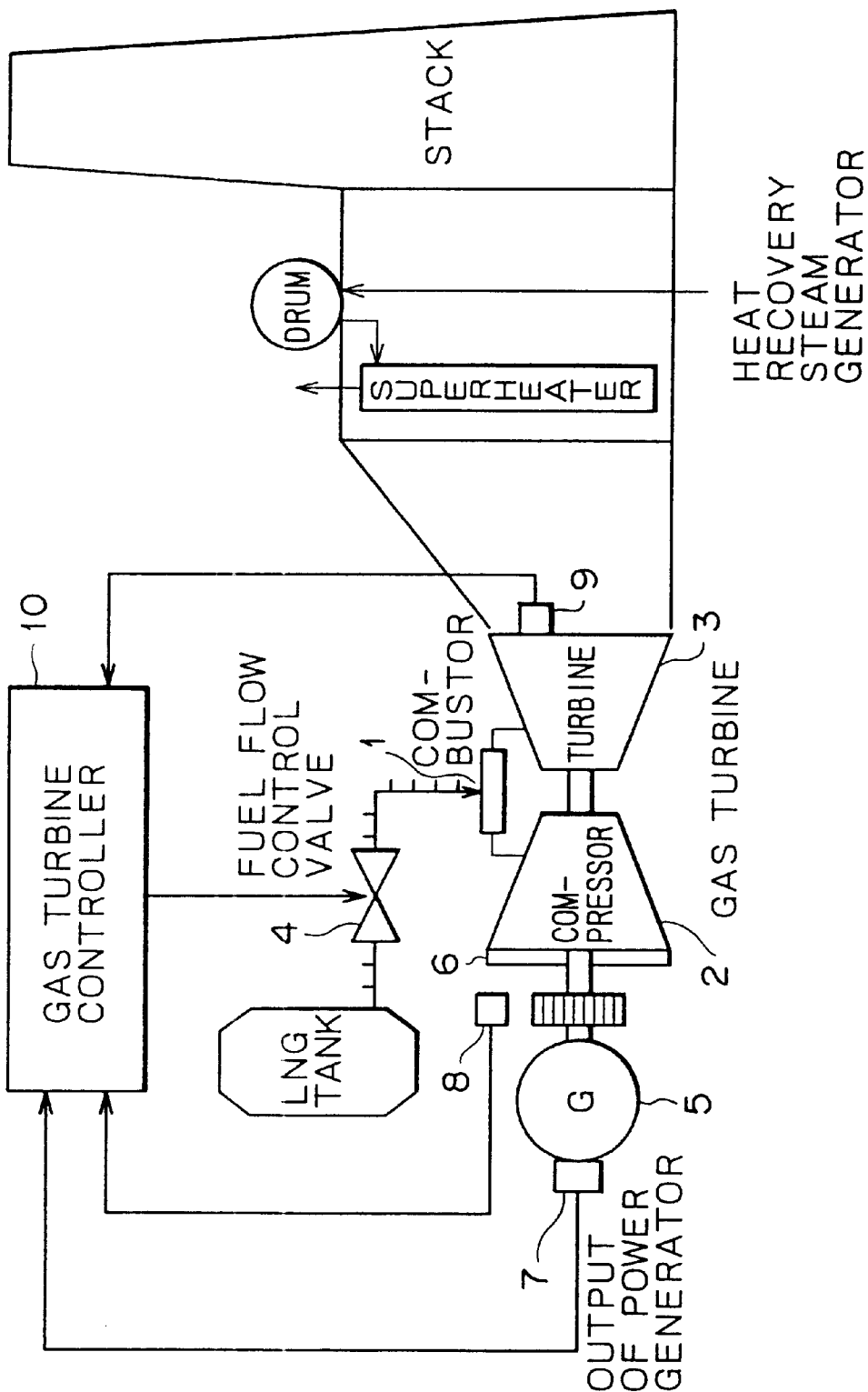
FIG. 3 is an illustration of a power plant provided with a gas turbine to which the present invention is applied.

A power plant control system in a first embodiment according to the present invention will be described with reference to the accompanying drawings. Referring to FIG. 3, a thermal power plant to which the present invention is applied is provided with a gas turbine comprising a combustor 1, a compressor 2 and a turbine 3, and a power generator 5 disposed coaxially with the gas turbine. The flow of fuel supplied from an LNG tank is controlled by a fuel flow control valve 4. The fuel is supplied together with air supplied from the compressor 2 to the combustor 1. A combustion gas produced by the combustor 1 drives the turbine 3 to generate a torque. An exhaust gas exhausted from the turbine 3 is discharged through a stack after heat of the same has been recovered by an exhaust gas heat recovery boiler.

Air to be supplied from the compressor 2 to the combustor 1 is taken through an IGV (inlet guide vane) 6 into the compressor 2. When controlling the gas turbine, the load on the compressor 2 is always fixed when the compressor 2 operates at a rated speed and hence the opening of the IGV is fixed. A gas turbine controller 10 controls the flow rate of the fuel by controlling the fuel flow control valve 4 by a load control signal. Generally the response characteristic of a fuel flow control valve is higher by one or more figures than that of IGV. Signals provided by a generated power sensor 7 placed on the power generator 5, a shaft speed sensor 8, and an exhaust gas temperature sensor 9 placed on the turbine 3 are sent to the gas turbine controller 10.

Figure 1:
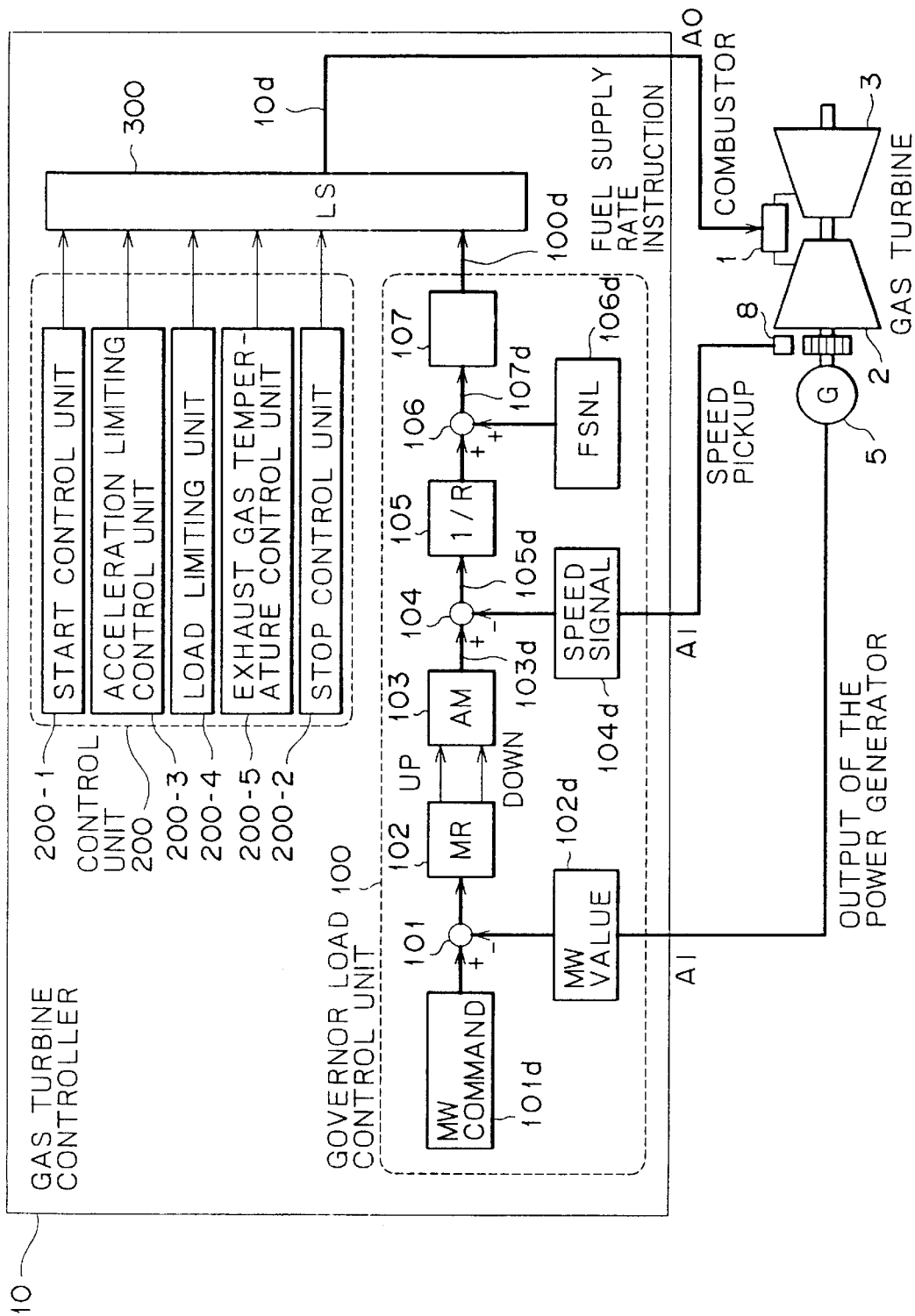
FIG. 1 is a block diagram of a power plant control system in a first embodiment according to the present invention.

FIG. 1 shows a gas turbine control system in a first embodiment according to the present invention. A fuel supply rate instruction 10d given to the fuel flow control valve 4 is the lowest one of signals provided by a governor load control unit 100 and a control unit 200 selected by a low signal selecting unit (LS) 300. The control unit 200 includes a start control unit 200-1 which becomes effective (minimum instruction) at starting, a stop control unit 200-2 which becomes effective at stopping, an acceleration limiting control unit 200-3 which becomes effective when the rate of change of the shaft speed exceeds an upper limit (a value equal to 110% of a rated speed) to avoid overspeed, a load limiting unit (load limiter) 200-4 which becomes effective when power specified by a load dispatching instruction (MW instruction) is outside a predetermined range to suppress the variation of the load beyond upper and lower limits, and an exhaust gas temperature control unit 200-5 which becomes effective when exhaust gas temperature rises beyond an upper limit to lower exhaust gas temperature by adjusting the fuel supply rate to a predetermined value. The foregoing configuration is the same as that of a conventional control unit.

The governor load control unit 100 comprises an adder 101 for determining the deviation of a MW value 102d provided by the generated power sensor 7 from a value specified by a load dispatching instruction 101d provided by a central load dispatching station, a monitor relay (MR) 102 for determining a positive or negative deviation not smaller than a fixed value, an analog memory (AM) 103 which produces a set load 103d according to the output of the monitor relay 102 at a predetermined change rate, an adder 104 which determines the deviation of a shaft speed (sped signal) 104d measured by a power generator speed sensor (speed pickup) 8 from the set load 103d, a multiplier 105 which multiplies the deviation determined by the adder 104 by the reciprocal of a speed droop ratio (R), an adder 106 which adds a rated no-load fuel supply rate instruction (FSNL) 106d, i.e., an offset value for a no-load state to the output of the adder 105 and provides a fuel supply rate instruction 107d, and a fuel supply rate instruction limiter 107 which suppresses the abrupt change of the fuel supply rate instruction 107d and provides a governor load control instruction 100d.

A load signal is converted into a speed component by using the change rate stored in the analog memory 103. The set load 103d represented by the speed component is called a set governor value. An operation for superposing a difference signal (governor-free control signal) 105d representing the difference between the set governor value 103d and the shaft speed 104d on a fuel flow rage command for a rated no-load state is called governor-free control. Continuously varying total load is represented by speed variation, and speed variation is suppressed to stabilize the system frequency. The speed deviation is multiplied by a governor gain, i.e., the reciprocal of the speed droop ratio, (R) to carry out load control according to the speed droop ratio.

Fore example, when speed droop ratio is 5%, governor gain 1/R=1/0.05=20. Therefore, if the speed increases by 5% of the rated speed, the fuel is supplied at a fuel supply rate of 200% equal to the superposition of a flow rate of 5%×(1/R)=5%×20=100% on an original set load. If the speed decreases by 5% of the rated speed, the fuel is supplied at a fuel supply rate of 0% determined by superposing −100% on the original set load (only the offset FSNL).

The configuration and operations of the fuel supply rate instruction limiter 107 featuring the governor load control unit 100 will be described below.

Figure 4:
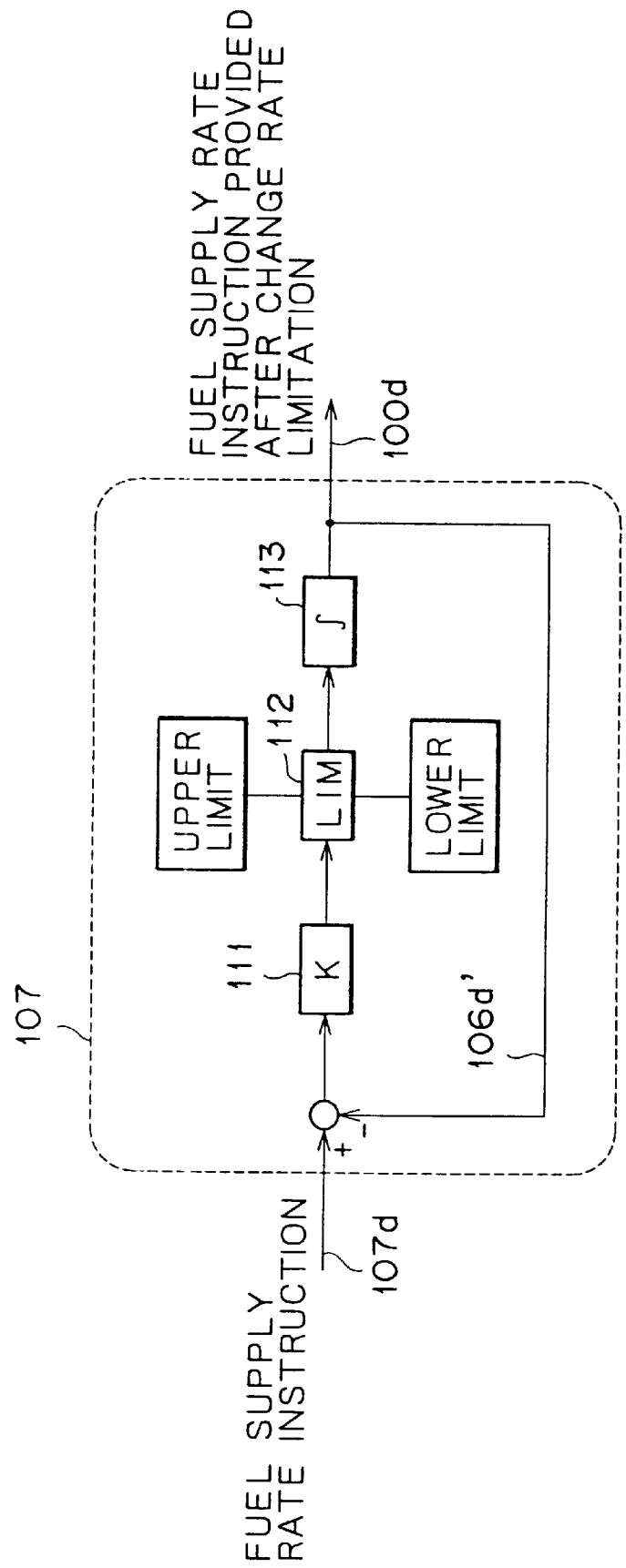
FIG. 4 is a block diagram of a fuel supply rate instruction limiting device included in the power plant control system of FIG. 1.

Referring to FIG. 4, the fuel supply rate instruction limiter 107, comprises a multiplier 111 which multiplies the difference between a fuel supply rate instruction 107d, i.e., a governor-free control signal, and a governor load control instruction 106d' (100d) by a fixed gain K, a limiter (LIM) 112 for limiting the upper and the lower limit of the output of the multiplier 111, and an integrating circuit 113 which adds the limited difference to the preceding value.

If the change rate of the fuel supply rate instruction 106d is lower than an upper limit (increasing change rate limiting value)/lower limit (decreasing change rate limiting value), the fuel supply rate instruction 106d is not changed. If the change rate is greater than upper limit/lower limit, the governor load control instruction 100d limited by the set change rate limiting value is provided. For example, the change rate limiting value is determined on the basis of the balance between a restriction by thermal stress dependent on the thermodynamic characteristic of the gas turbine and fuel-air ratio and system contribution ratio.

Figure 7A:
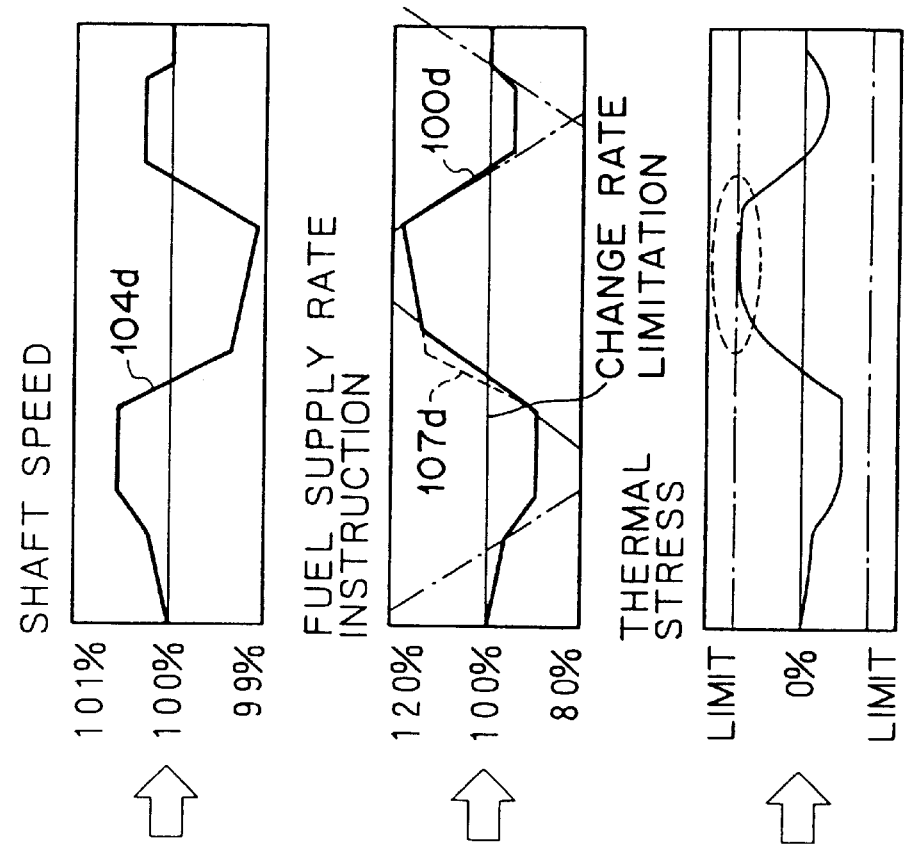
FIGS. 7A and 7B are diagrams showing the behavior of a power plant controlled by the power plant control system in the first embodiment according to the present invention and that of a power plant controlled by a conventional power plant control system.
Figure 7B:
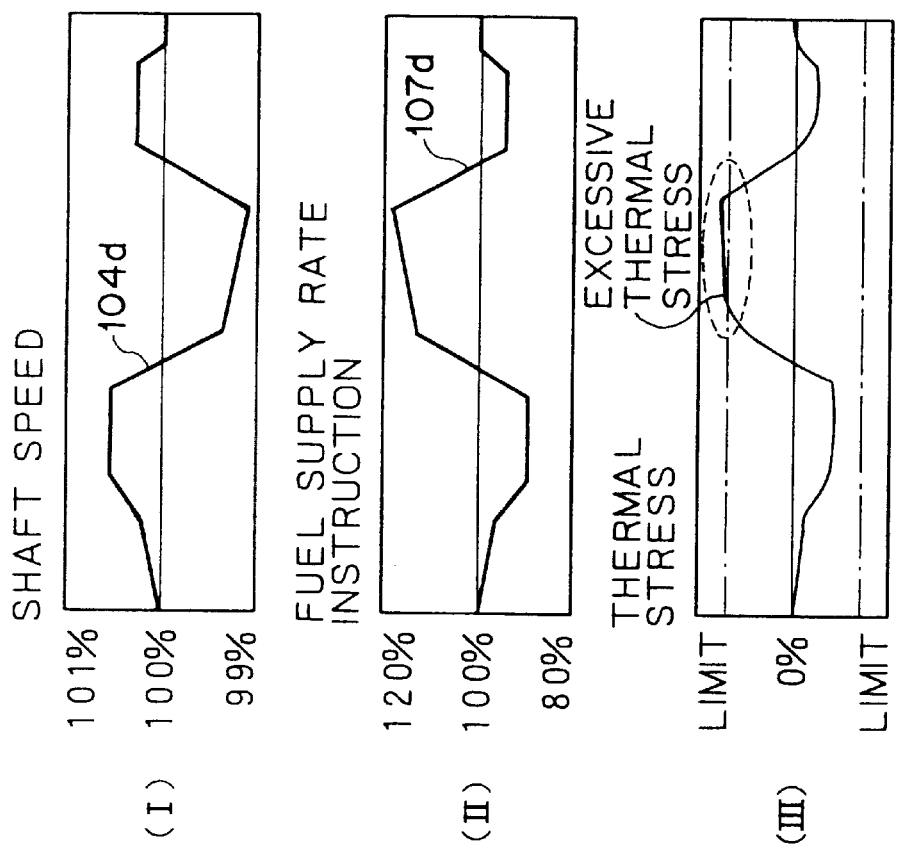

FIGS. 7A and 7B are diagrams showing the behavior of a power plant controlled by governor load control. In FIGS.

7A and 7B, I, II and III show the variations of shaft speed (system frequency), fuel supply rate instruction and thermal stress induced in the gas turbine, respectively. FIG. 7A shows conventional governor load control not using the fuel supply rate instruction limiter 107, in which the shaft speed varies in the range of ±1% of the rated shaft speed.

If the speed droop ratio of the power plant is 5%, a fuel supply rate instruction of −20% of the rated value is added for a speed variation of 1% of the rated speed. Therefore, the fuel supply rate command 107d shown in FIG. 7B varies according to the variation of the shaft speed (system frequency) shown in FIG. 7A. Thermal stress induced in the gas turbine has a tendency to vary according to the variation of the fuel supply rate command and the system frequency. As shown in (c), a high thermal stress is produced when the fuel supply rate command changes at a high rate and, in some cases, the amount of thermal stress exceeds a limit thermal stress determined for the gas turbine.

The governor load control operation of a conventional gas turbine control system does not take any measures when the thermal stress exceeds a limit, only monitors thermal stress, and feeds back a measured thermal stress for the calculation of the life of a main machine. As mentioned in the description of the prior art, the prior art gas turbine control system changes governor load control for exhaust gas temperature control to keep load constant so that thermal stress decreases below the limit.

FIG. 7B shows the behavior of the power plant controlled by the gas turbine control system in the first embodiment. The governor load control unit 100 is provided with a fuel supply rate instruction limiter 107. The variation of the shaft speed shown in FIG. 7A is the same. As shown in FIG. 7B, the governor load control instruction 100d, i.e., the fuel supply rate instruction after change rate limitation has become effective, varies as indicated by continuous line. A long and short dash line indicates change rate limit provided by the fuel supply rate command limiter 107 to limit the change rate of the fuel supply rate instruction. Since the change rate of the governor load control instruction 100d is kept below the limit, the variation of the fuel supply rate command 107d is more moderate than that of the fuel supply rate command 107d controlled by the conventional system (broken lines). Consequently, thermal stress can be kept below the limit as shown in (c).

Figure 2:
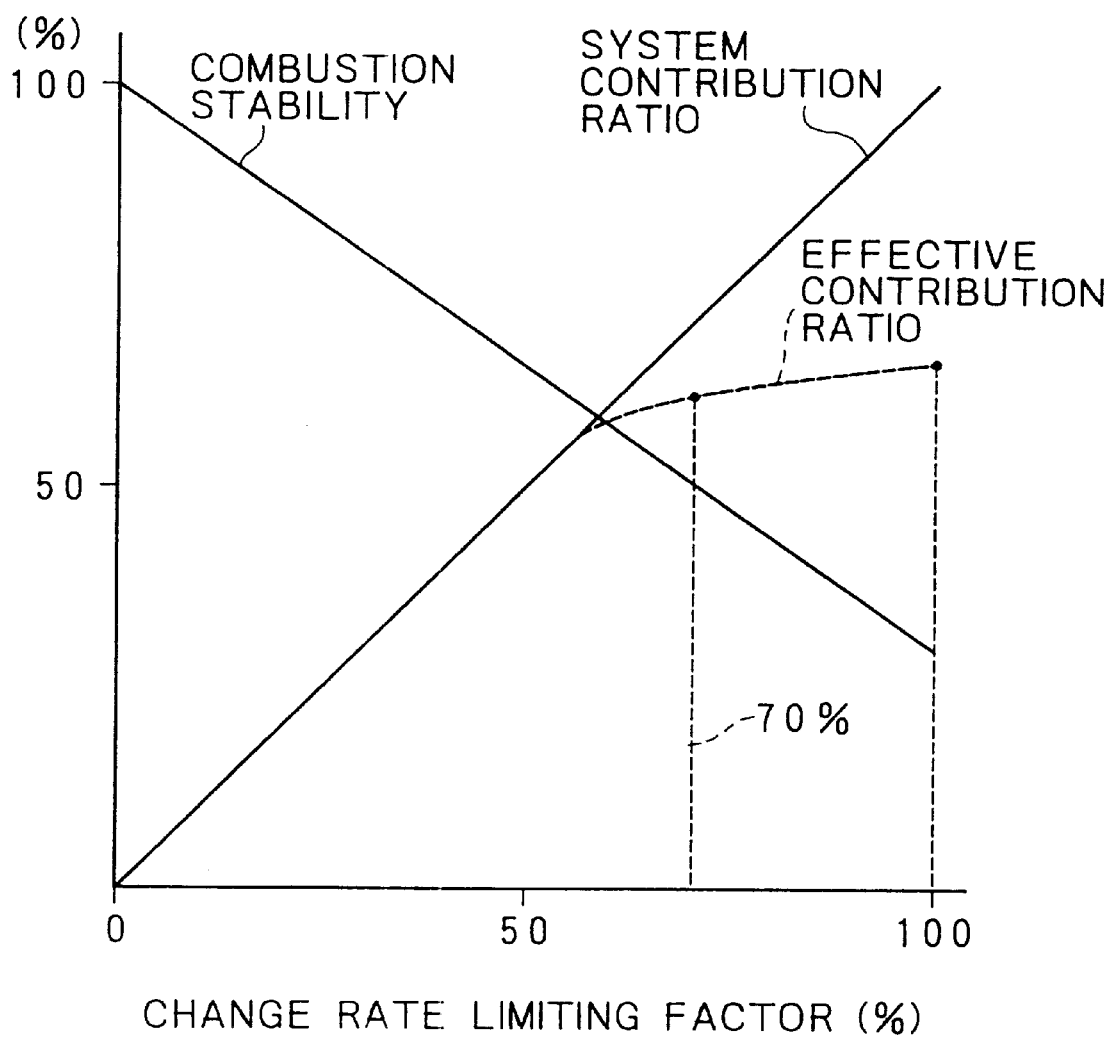
FIG. 2 is a diagram of assistance in explaining the conception of effective contribution ratio which is one of indices of limiting a load instruction in accordance with the present invention.

Although the effect of limiting the change rate of the fuel supply rate command is expressed by the suppression of thermal stress in FIGS. 7A and 7B, it goes without saying that the limitation of the change rate has a direct effect on avoiding unstable combustion due to the abrupt change of the fuel-air ration. The gas turbine control system exercises a governor-free control function on the variation of the shaft speed (system frequency) for the general operation of the power plant. Incidentally, there is no substantial effect of the fuel supply rate instruction limiter 107 on governor-free control when the change rate limit determined by the fuel supply rate instruction limiter is in the range of effective contribution ratio shown in FIG. 2.

Figure 5A:
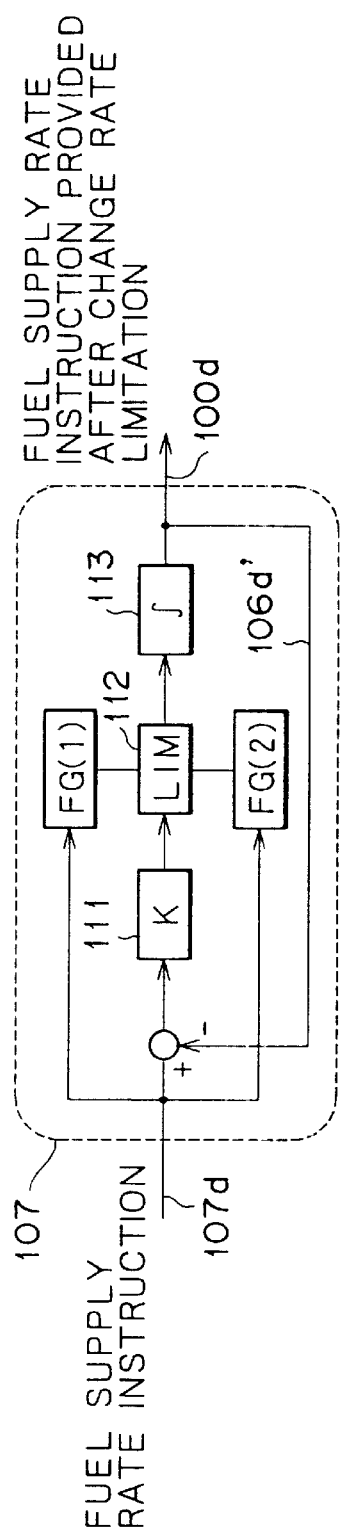
FIGS. 5A, 5B and 5C are a block diagram and diagrams, respectively, of assistance in explaining the configuration and limiting characteristic of another fuel supply rate instruction limiting device in accordance with the present invention.
Figure 5C:
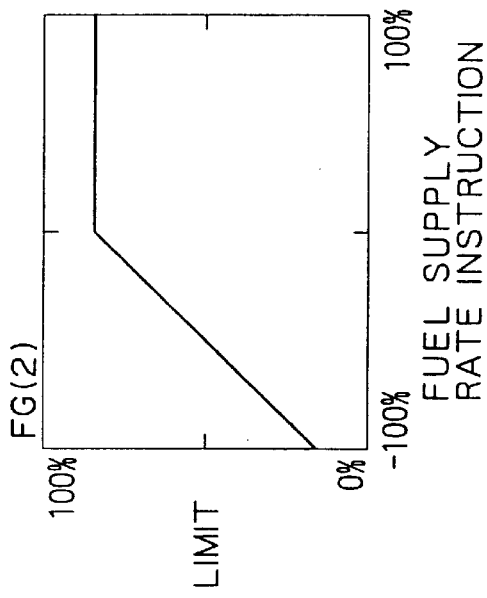
Figure 5B:
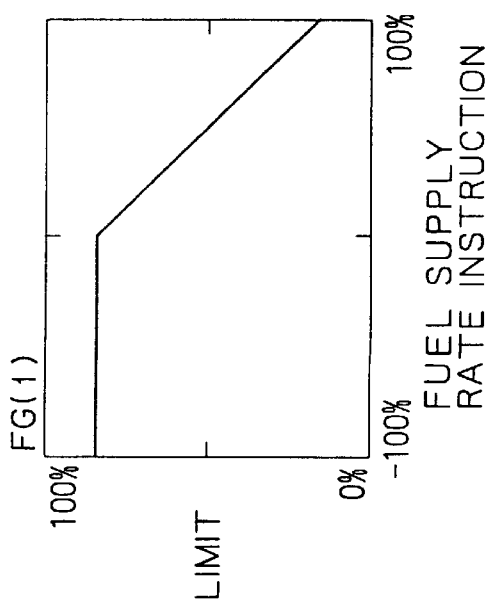

FIG. 5 shows another fuel supply rate instruction limiter 107 in accordance with the present invention. The fuel supply rate instruction limiter 107 shown in FIG. 5 differs from that shown in FIG. 4 in that a limiter 112 provides variable upper and lower limits and provides upper and lower limits as functions of fuel supply rate instruction determined by functions generated by function generators FG(1) and FG(2). FIGS. 5B and 5C show upper and lower limits expressed by functions generated by function generators FG(1) and FG(2), respectively, by way of example.

As shown in FIG. 5, upper and lower limits for the fuel supply rate instruction 107d are determined as functions of the fuel supply rate instruction 107d, respectively, to take into consideration the absolute value of a value specified by the fuel supply rate instruction 107d superposed by governor-free control in addition to the change rate of the fuel supply rate instruction 107d. When a value specified by the fuel supply rate instruction is large, the upper and the lower limit are reduced to reduce the change rate. If a value specified by the fuel supply rate instruction is small, the upper and the lower limit are raised to reduce restriction on the change rate. Consequently, the range of variation of the fuel supply rate instruction is narrowed when the gas turbine is operating in a high-load operating mode in which thermal stress is liable to be induced in the gas turbine and combustion tends to be unstable. Thus, the production of excessively high thermal stress in the gas turbine and unstable combustion can be avoided. On the other hand, while the gas turbine is operating substantially under a rated load, the operation is maintained by slightly reducing governor-free performance to stabilize the system frequency.

Figure 6:
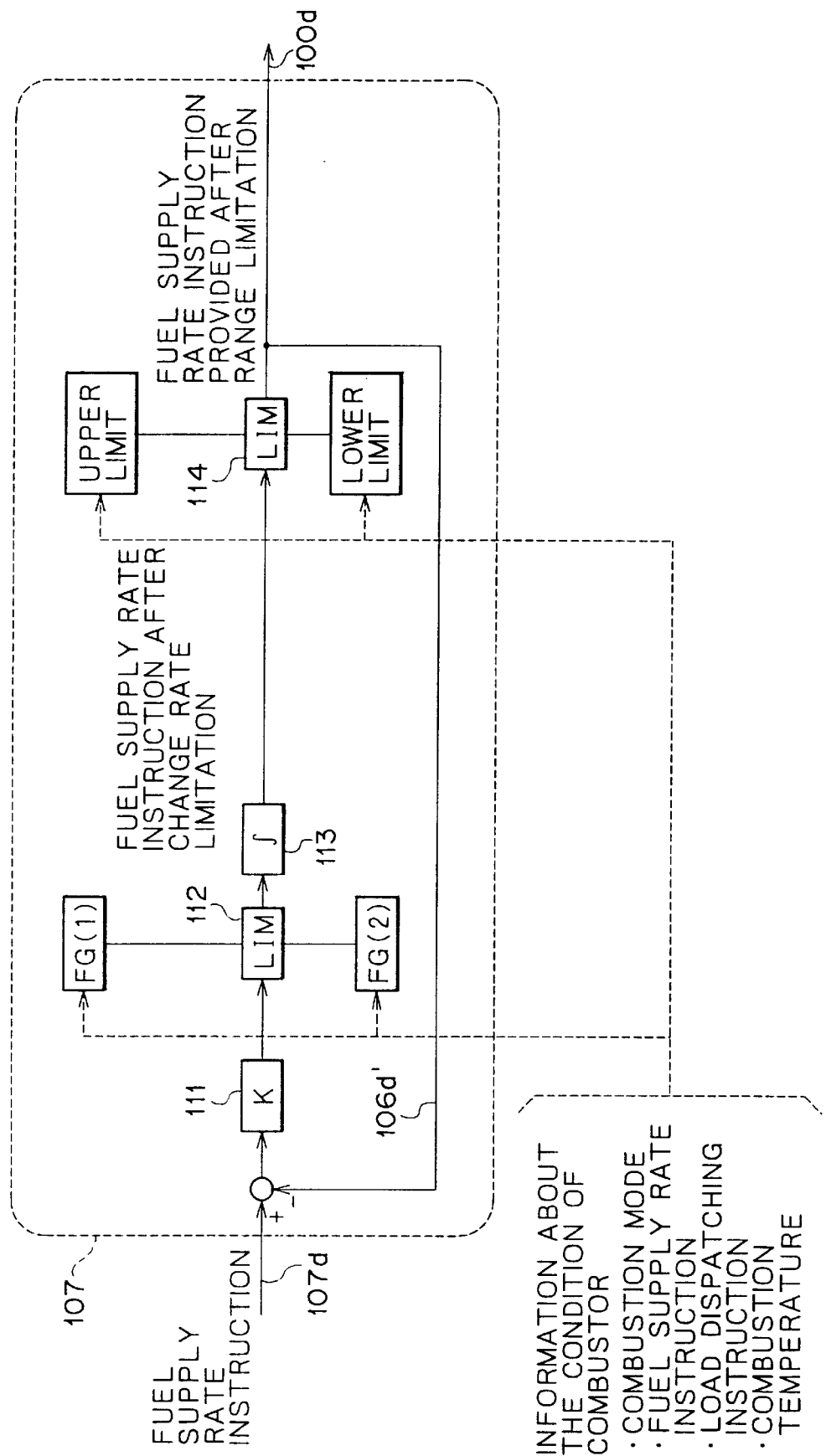
FIG. 6 is a block diagram of a third fuel supply rate instruction limiting device in accordance with the present invention.

FIG. 6 shows a third fuel supply rate instruction limiter 107 in accordance with the present invention. The fuel supply rate instruction limiter 107 shown in FIG. 6 has function generators which generate functions FG(1) and FG(2) similar to those shown in FIG. 5B. One or some of pieces of information about combustion mode, fuel supply rate instruction, load dispatching instruction provided by a central load dispatching station and combustion temperature are applied to the inputs of the function generators. Restrictions are adjusted minutely according to the operating condition of the combustor.

The fuel supply rate instruction limiter 107 is provided, in addition to the limiter 112 for limiting the change rate of fuel supply rate instruction, with a limiter (LIM) 114 for limiting the absolute value of fuel supply rate to set an upper limit (positive maximum) and a lower limit (negative maximum). The limiter 114 sets an optimum upper limit and an optimum lower limit according to the condition of the power plant.

The load control system in this embodiment for controlling load on the power plant limits the change rate of the fuel supply rate instruction for governor load control, or the change rate and the absolute value. Therefore, unstable combustion and the production of excessively high thermal stress due to the abrupt change of the fuel supply rate instruction can be suppressed, the governor function can be maintained, the stable operation of the gas turbine can be ensured and the life of the gas turbine can be extended.

Theoretically, when the change of the fuel supply rate instruction is limited, the system contribution ratio decreases by an amount corresponding to a limited amount of the flow rate specified by the fuel supply rate instruction. However, the substantial reduction of governor function is insignificant if the fuel supply rate instruction is limited taking into consideration effective system contribution ratio determined by taking mechanical inertia into consideration.

In controlling a power plant by a conventional load control system, it often occurs that temperature rises beyond a critical temperature at which thermal stress is induced and combustion becomes unstable in operation substantially under a rated load if the fuel supply rate instruction 107d changes greatly. To avoid such problems governor load control must be interrupted and temperature load control must be performed. This embodiment, however, enables governor load control under partial load, rated load or substantial rated load and improves substantial system contribution ratio.

A load control system in a second embodiment according to the present invention for controlling a power plant will be described below. When a system load connected to a power generator drops abruptly, a shaft is controlled properly so that its rotating speed is nearly equal to a rated rotating speed because a fuel supply rate specified by a fuel supply rate instruction and the load balance each other when the power generator is operating in a normal operating mode. When the load drops abruptly due to a system fault or the like, the balance of the fuel supply rate instruction and the load is lost and the operating speed of the turbine rises sharply.

A governor load control function stabilizes the operating speed of the turbine. Therefore, the governor load control reduces the fuel supply rate when the turbine operates in an overspeed mode. Generally, the turbine is designed so that the turbine blades withstand stress induced by centrifugal force or the like when the operating speed is 110% of the rated operating speed or below. Therefore, the turbine must promptly be stopped before the operating speed of the same rise beyond a operating speed equal to 110% of the rated operating speed. It is more desirable, in view of avoiding the reduction of the life of the equipment, to bring the turbine to a stop by gradually reducing the operating speed by reducing the fuel supply rate than to stop the turbine by mechanical emergency shut-down.

Figures 8A, 8B:
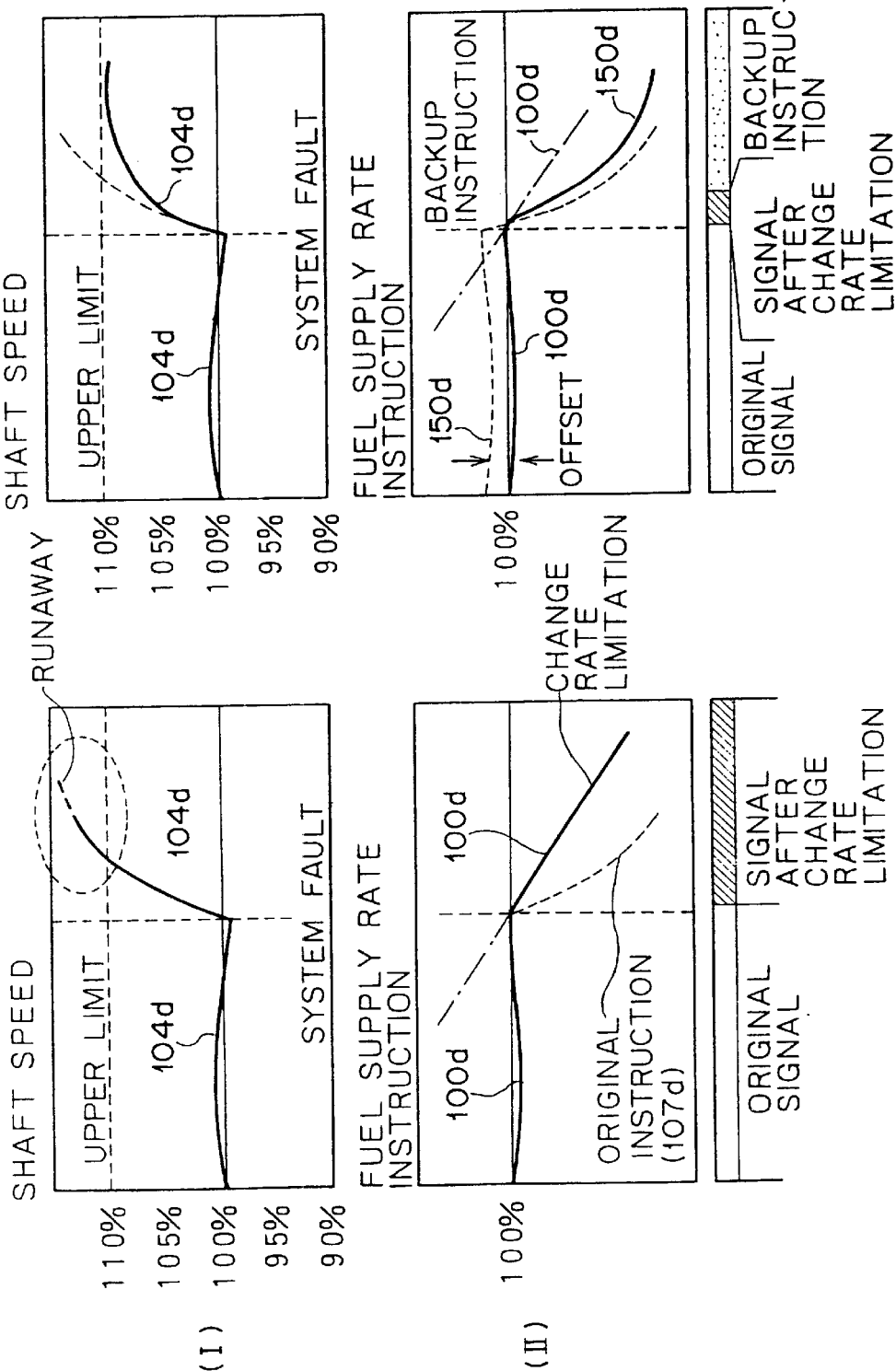
FIGS. 8A and 8B are diagrams showing the variation of speed and fuel supply rate instruction when power plants are controlled by the power plant control system in the first embodiment and a power plant control system in a second embodiment according to the present invention.

Since the governor load control unit 100 shown in FIG. 1 prevents the abrupt change of the governor load control instruction 100d, a sufficient decelerating function is not available to reduce the operating speed in an overspeed range. FIG. 8A shows the behavior of the power plant when a system fault occurs. Upon the occurrence of a system fault, the shaft speed starts increasing sharply (I), and the fuel supply rate instruction 107d (dotted line) changes to the fuel supply rate instruction 100d after change rate limitation has become effective (continuous line) (II). Consequently, the reduction of the fuel supply rate is delayed and the rotating speed of the shaft rises beyond an upper limit (generally, a rotating speed equal to 110% of the rated rotating speed). Thus, it is desirable to limit the change rate of the fuel supply rate instruction provided by the governor load control unit while the rotating speed is in the normal range and not to limit the same when the rotating speed is in the overspeed range.

Figure 9:
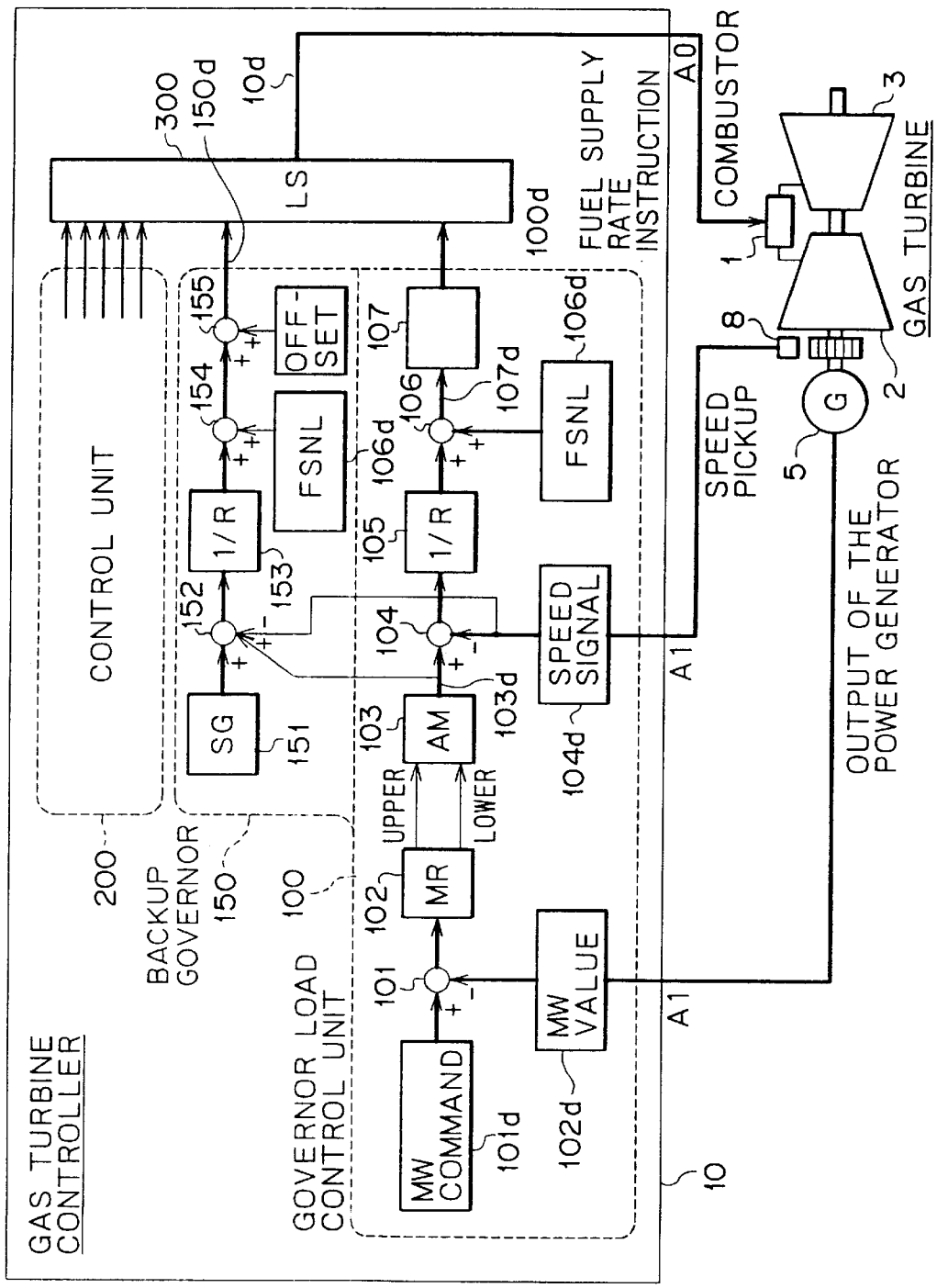
FIG. 9 is a block diagram of the power plant control system in the second embodiment.

FIG. 9 shows the gas turbine controller 10 in the second embodiment according to the present invention. The gas turbine controller 10 has a governor load control unit 100, which is similar to that shown in FIG. 1, for limiting the change of a fuel supply rate instruction while the gas turbine is in a normal operation, and a backup governor 150 for reducing fuel supply rate for deceleration when the operating speed of the gas turbine increases to an overspeed.

The backup governor 150 has an adder 152 which calculates a governor-free control signal by using the deviation of a shaft speed 104d from a value obtained by adding a correction signal provided by a signal generator (SG) 151 to a set load 103d provided by an AM 103, a multiplier 153 for multiplying the governor-free signal by a governor gain (1/R), an adder 154 for adding a no-load offset FSNL 106d to the output of the multiplier 153, and an adder 155 for adding a standby offset to the output of the adder 154 to maintain a fuel supply rate instruction 150d provided by the backup governor 150 is higher than a governor load control instruction provided by the governor load control unit 100 while the gas turbine is operating normally.

FIG. 8B shows the behavior of a power plant provided with the backup governor 150. Upon the occurrence of a system fault, shaft speed starts increasing sharply (I) in a mode similar to that shown in FIG. 8A. A fuel supply rate instruction 100d is provided by the governor load control unit 100 before the occurrence of the system fault. In this state, a backup fuel supply rate instruction 150d provided by the backup governor 150 is greater than the fuel supply rate instruction 100d by 20% of the fuel supply rate instruction 100d corresponding to 1% of a system frequency. Therefore, the backup fuel supply rate instruction 150d is not selected by a low-value selector circuit (LS) 300. Upon the occurrence of a system fault, the instruction 150d decreases sharply, whereas the instruction 100d decreases moderately owing to the effect of change rate limitation. The moment the instruction 100d becomes greater than the instruction 150d, the fuel supply rate instruction 150d provided by the backup governor 150 is selected to reduce the fuel supply rate quickly. Consequently, the shaft speed decreases sharply (I) and the rise of the shaft speed into an overspeed range beyond an upper limit can be avoided. If the system frequency is higher by +5%, the instruction 150d specifies a reduction equal to 100% of the rated value and hence an actual fuel supply rate is reduced sharply toward 20% of the offset.

In the gas turbine controller 10 shown in FIG. 9, the backup governor 150 is separate from the governor load control unit 100. It is also possible to connect a bypass to the fuel supply rate instruction limiter 107 of the governor load control unit 100, and to select the bypass when the speed increases beyond a predetermined limit speed.

Although the load control system according to the present invention has been described as applied to controlling a power plant provided with a gas turbine, the present invention is not limited thereto in its practical application and may be applied to a governor for limiting the production of thermal stress in a back boiler in a combined gas turbine plant and a governor for limiting the production of thermal stress in a steam turbine. When the load control system is applied to the control of a steam turbine, the load control instruction is a steam flow rate instruction.

According to the present invention, load on the turbine is controlled by the operation instruction obtained by restricting the change rate and the value of the governor load control signal. The governor load control is maintained and the production of thermal stress in the power generating equipment and unstable combustion can be avoided.

Moreover, the governor load control is possible when the load is nearly equal to the rated load and the system contribution ratio can substantially be improved.

Still further, the change of the governor load control signal is limited in the normal operation, and restriction is removed from the governor load control signal in the overspeed operation. Therefore, the intrinsic reducing effect of governor-free control can be exercised and the power plant can achieve a fail-safe operation.

What is claimed is:

1. A power plant load control method to be applied to a power plant provided with a turbine and a power generator coaxially connected to the turbine to control load on the turbine so that a system frequency may be stabilized, said power plant load control method comprising the steps of:

producing a governor load control signal on the basis of a load dispatching instruction given according to the change of the system frequency to the power plant, generated power, measured shaft speed and a predetermined system speed droop ratio;

determining an operation instruction by multiplying the governor load control signal by a value determined by a load limiting function for limiting the change rate of the governor load control signal; and controlling load on the turbine according to the operation instruction.

2. The power plant load control method according to claim 1, wherein if the turbine is a gas turbine combined with a combustor, the operation instruction represents a fuel supply rate, and the load limiting function is formed so as to suppress at least either thermal stress production in the gas turbine or unstable combustion.

3. The power plant load control method according to claim 1, wherein if the turbine is a steam turbine, the operation instruction represents a steam supply rate, and the load limiting function is formed so as to suppress thermal stress production in the steam turbine.

4. The power plant load control method according to claim 1, wherein the load limiting function limits the change rate of the governor load control signal variably according to a coefficient for limiting the change rate of the governor load control signal of a value represent by the governor load control signal.

5. The power plant load control method according to claim 1 further comprising the step of controlling load on the turbine by using the operation instruction obtained by multiplying the governor load control signal by the load limiting function when the turbine is operating in a normal operating mode where the turbine operates at a speed in a predetermined range with respect to a rated speed under a rated load or a partial load;

wherein the governor load control signal is selected to control the load on the turbine when the turbine operates in an overspeed mode where shaft speed is higher than the upper limit of a predetermined range.

6. A power plant load control system for controlling load on a gas turbine so as to stabilize system frequency, comprising:

a gas turbine comprising a fuel supply valve, a combustor and a turbine;

a power generator disposed coaxially with the turbine; and a governor load control means for determining a governor instruction on the basis of a deviation of generated power from a power generation instruction (MW instruction) given thereto by a central load dispatching station according to the variation of system frequency, and determining a fuel supply rate instruction corresponding to a speed droop ratio according to a deviation of shaft speed from a governor instruction;

wherein the governor load control means has a fuel supply rate instruction limiting means for limiting change rate of the fuel supply rate instruction corresponding to a speed droop ratio according to a deviation of shaft speed from a governor instruction;

wherein the governor load control means has a fuel supply rate instruction limiting means for limiting change rate of the fuel supply rate instruction so that the production of thermal stress in the gas turbine and unstable combustion may be suppressed; and wherein the fuel supply rate instruction limiting means is a fixed limiter capable of limiting change rate of the fuel supply rate instruction to a value below a fixed coefficient or a functional limiter capable of limiting the change rate of the fuel of the fuel supply rate instruction to values as a function of the fuel supply rate instruction.

7. The power plant load control system according to claim 6, wherein the fuel supply rate instruction limiting means is provided with a limiter capable of limiting a value after limiting the change rate of the fuel supply rate instruction.

8. The power plant load control system according to claim 6, further comprising:

a backup governor means for determining a fuel supply rate instruction corresponding to the speed droop ratio according to a deviation of shaft speed from the governor instruction, adding an offset to the fuel supply rate instruction to provide a second fuel supply rate instruction higher than a first fuel supply rate instruction provided by the fuel supply rate instruction control means in a normal state; and a low value selecting means for selecting the smaller one of the first and the second fuel supply rate instruction;

wherein the first fuel supply rate instruction is used in a normal state and the second fuel supply rate instruction is used in an overspeed state for load control.

* * * * *